Feb. 1, 1927. 1,616,429
J. E. McCRILLIS
AUTOMOBILE STEERING STABILIZER
Filed Jan. 19, 1925
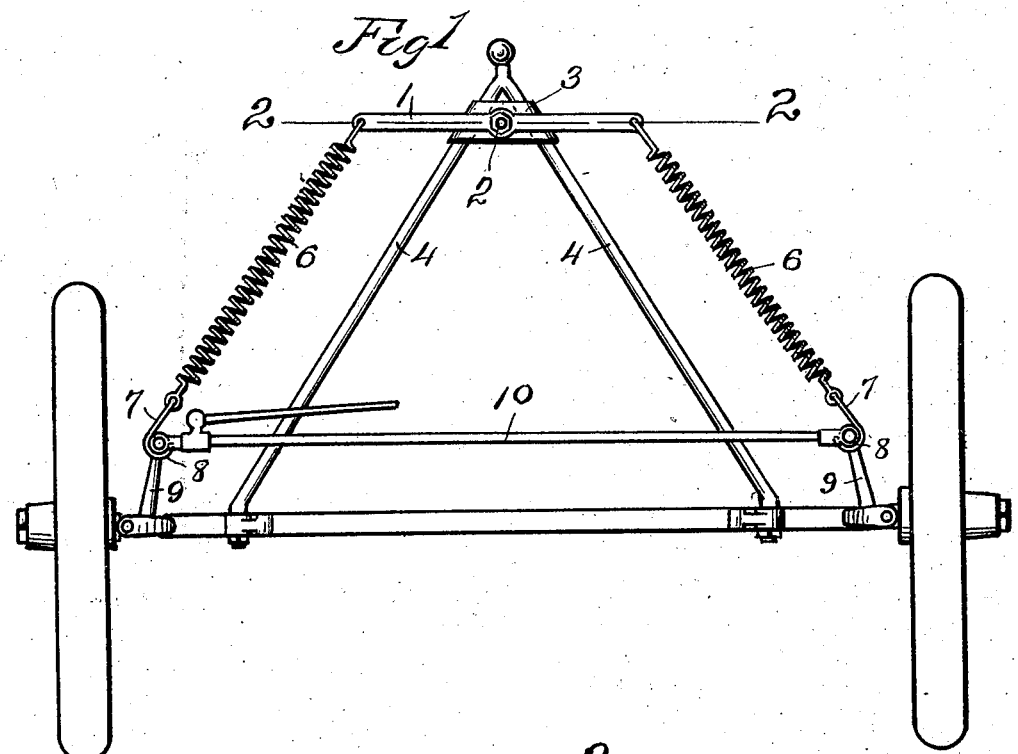
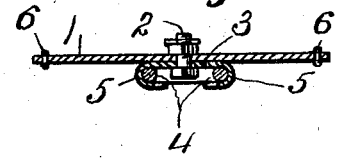
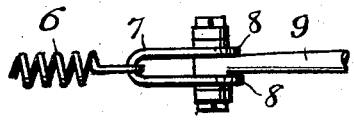
Witness:
R. E. Hamilton
INVENTOR.
Joseph E. McCrillis
BY Warren D. House
His ATTORNEY.

Patented Feb. 1, 1927.

1,616,429

UNITED STATES PATENT OFFICE.

JOSEPH E. McCRILLIS, OF KANSAS CITY, MISSOURI, ASSIGNOR TO FRED B. LEONARD.

AUTOMOBILE STEERING STABILIZER.

Application filed January 19, 1925. Serial No. 3,385.

My invention relates to improvements in automobile steering stabilizers.

One of the objects of my invention is to provide a novel steering stabilizer, which is simple, cheap, strong, durable, not liable to get out of order, which is efficient in operation, and which can easily and quickly be attached without outside accessory means to automobiles now in use.

A further object of my invention is to provide novel equalizing means by which when one of two coil springs, which are respectively attached to the steering spindles of an automobile, is stretched in one direction, the other spring will be stretched in the opposite direction, whereby the springs will automatically, and instantly return the steering spindles to the straight-ahead positions.

A further object of my invention is to provide a novel stabilizer of the kind described, which will render the steering operation an easy one, and which will prevent accidents due to one or other of the front wheels upon striking an obstruction swerving the machine, so as to be liable to cause an accident, such as overturning of the machine.

The novel features of my invention are hereinafter fully described and claimed.

In the accompanying drawing, which illustrates the preferred embodiment of my invention, Fig. 1 is a plan view of my improved stabilizer shown mounted on the chassis of an automobile.

Fig. 2 is a vertical sectional view on the line 2—2 of Fig. 1.

Fig. 3 is an enlarged detail showing one end portion of one of the coil springs attached to a steering spindle arm.

Fig. 4 is a perspective view of one of the two hooks, which are respectively attached to the two coil springs, and which are adapted for attachment to the two spindle arms of the machine.

Similar reference characters designate similar parts in the different views.

1 designates an equalizing bar which is centrally pivoted on a vertical bolt 2, which extends through a supporting member, which may comprise a plate 3, adapted to be mounted on top of the wishbone radius rod 4 of an automobile, and which is provided at its lateral edges respectively with two diverging downwardly and inwardly extending edge portions 5, which are adapted to respectively embrace the under sides of the rods 4.

6 designates two coil tension springs, the rear ends of which are attached to the bar 1 at opposite sides of and at equal distances from the pivot bolt 2.

7 designates two U-shaped members, the arms of which are respectively provided with hooks 8, adapted to embrace the adjacent steering spindle arm 9 of the automobile.

10 designates the steering rod which connects the spindle arms 9. The points of attachment of the springs to the equalizing bar 1 are at the outer sides of straight lines connecting the axis of the bar with the points of attachment of the springs 6 to the steering arms 9. This construction permits of the bar 1 equalizing the strain upon the springs, when the steering arms are swung in either direction, as the bar will be swung by one spring, thereby stretching the other spring, and dividing the load between the springs, and enabling the utilizing of lighter spring wire without liability of breakage.

In mounting the apparatus on an automobile, the supporting plate 3 has its portions 5 slipped forwardly onto the radius rod 4, after which the hooks 8 are respectively engaged with the spindle arms 9, thus placing both springs 6 in a state of similiar tension, whereby the plate 3 is held without other fastening means engaged with the rods 4.

If now the rod 10 is operated, in the steering of the machine, to swing the spindle arms 9, the arm which moves outwardly will stretch the adjacent spring 6, which spring will swing the equalizing bar 1 to stretch the other spring in the opposite direction.

As soon as the rod 10 is released, the springs 6 will immediately operate to bring the forward wheels to the straight-ahead position.

If one of the wheels strikes an obstruction, so as to tend to swerve the machine, from the straight-ahead position, the springs 6 and equalizing bar 1 will immediately operate to restore the straight-ahead position, thereby avoiding liability of accident and possible injury to the machine or its occupants.

I do not limit my invention to the structure shown and described, as various modifications, within the scope of the appended claims may be made without departing from the spirit of my invention.

What I claim is:—

1. In an automobile steering stabilizer, an equalizing bar, means for pivotally fastening said bar on a vertical axis, and two coil springs fastened at one set of ends to said equalizing bar at opposite sides respectively of the axis of the latter, the other set of ends of said springs having means for being respectively attached to the two steering arms of the spindles of the automobile, the points of attachment to said bar on said springs being, when the springs are attached to said arms, out of straight lines intersecting said axis and the points of attachment of said springs to said arms.

2. In an automobile steering stabilizer, a member having two diverging downwardly and inwardly extending edge portions adapted to respectively embrace the upper and lower sides of the wishbone radius rods of an automobile, an equalizing bar pivoted on a vertical axis to said member, and two coil springs attached at one set of ends to said bar at opposite sides respectively of the axis of the latter said springs at their opposite ends having hooks for respectively engaging the steering spindle arms of the automobile for holding said springs under tension.

3. In an automobile steering stabilizer, two coil springs having means at one set of ends for attachment to the two spindle steering arms of an automobile, and equalizing means adapted to be mounted on the chassis of said automobile and attached to the opposite set of ends of said coil springs and having means by which when the springs are attached to said steering arms and one spring is pulled in one direction, the equalizing means will exert a pull on the other spring in the opposite direction.

4. In an automobile steering stabilizer, a plate having two diverging downwardly and inwardly extending edge portions adapted to respectively embrace the upper and lower sides of the wishbone radius rods of an automobile, a bolt extending vertically through said plate, an equalizing bar pivotally mounted on said bolt, two coil springs attached at one set of ends to said equalizing bar at opposite sides of said bolt, the other set of ends of said springs being provided with two hooks respectively adapted to engage the two spindle steering arms of the automobile so as to fasten said springs thereto in a state of tension.

5. In an automobile steering stabilizer, the combination with the chassis and spindle steering arms, of two springs respectively attached to said arms, and equalizing means connecting said springs with said chassis by which when the arms are swung in either direction from straight ahead tension will be placed on both springs simultaneously tending to swing said arms to the straight ahead.

6. In an automobile steering stabilizer, the combination with the chassis and spindle steering arms, of an equalizing bar pivoted to the chassis, and two springs respectively attached to said arms and attached to said bar at opposite sides of the axis of the latter, the points of attachment of the springs to said bar being out of the straight lines which intersect the axis and the points of attachment of the springs to said arms.

In testimony whereof I have signed my name to this specification.

JOSEPH E. McCRILLIS.